Feb. 27, 1968 R. F. PEYTON 3,370,804

TAPE TRANSPORT APPARATUS

Filed June 8, 1966

INVENTOR.
ROBERT F. PEYTON

BY

ATTORNEYS

United States Patent Office 3,370,804
Patented Feb. 27, 1968

3,370,804

TAPE TRANSPORT APPARATUS

Robert F. Peyton, Palo Alto, Calif., assignor to Newell Associates, Inc., Sunnyvale, Calif., a corporation of California Filed June 8, 1966, Ser. No. 556,117
7 Claims. (Cl. 242—55.12)

This invention relates to tape transport apparatus and is particularly useful for transporting a length of pliable recording tape wrapped to form supply and take-up rolls as employed in magnetic recording apparatus.

Heretofore, as shown in copending application Ser. No. 480,324, filed Aug. 17, 1965 and assigned to the assignee herein, tape transport apparatus have been provided wherein a drive capstan is arranged in edge driving relation to supply and take-up rolls which, as the tape is fed from supply to take-up roll, the diameters of the rolls change and their axes of rotation respectively advance laterally toward and retreat from the drive capstan. As previously disclosed, means are provided for forming a greater force for providing contact pressure between the take-up roll and capstan than the force for providing contact pressure applied between the supply roll and capstan. The difference between these forces can be referred to hereinafter as a force differential across the capstan.

The present invention serves as an improvement over the construction shown in the above identified application. The development of a force differential across the capstan is derived from and responsive to unwrapping tape from the supply roll and wrapping tape upon the take-up roll.

As disclosed herein, the degree of difference in the force differential across the capstan remains independent of roll size or lateral positioning of the axes of rotation of the rolls. Thus, if a particularly large diameter roll of tape is first employed with the apparatus and subsequently a small roll of tape is substituted for it, no adjustment of the tape transport apparatus is necessary in order to preserve the same degree of differential in the applied forces.

Further, according to the transport apparatus disclosed herein, frictional forces have been removed from the capstan shaft so as to minimize dissipation of power applied to drive the capstan shaft.

According to one embodiment as disclosed herein, a limited degree of braking is applied to the rolls by the same means as employed to generate the force differential across the capstan.

According to another embodiment as disclosed herein, cords have been eliminated from the construction so as to draw less energy from the rotating parts.

In general, it is an object of the present invention to provide an improved tape transport apparatus.

It is another object of the invention to provide a tape transport apparatus of the kind described in the above identified application incorporating improved means for generating a force differential across the drive capstan.

These and other objects of the invention will become more clearly apparent from the following detailed description of preferred embodiments of the invention when considered in conjunction with the accompanying drawings, in which.

In general, there is provided a tape transport apparatus of the type adapted to support a length of pliable recording tape wrapped to form supply and take-up rolls and annular rotating means, such as a capstan, having resilient arcuate surface portions disposed to be adapted to contact and rotate the supply and take-up rolls thereby feeding tape from the former to the latter. First and second carriages have been provided which are independently movable so that the supply and take-up rolls can respectively advance and retreat relative to the annular rotating means, thereby maintaining edge driving contact relation with the capstan by accommodating changes in roll diameter. Means have been provided which, during transfer of tape from the supply to take-up roll will yieldingly urge both rolls against the annular rotating means and in this manner compressive forces are supplied between the rotating means and the rolls. Finally, means are provided responsive to wrapping of tape upon the take-up roll which tend to increase the compressive force between the take-up roll and the annular rotating means, as well as means responsive to withdrawal of tape from the supply roll which tend to reduce the compressive force between the supply roll and the annular rotating means.

Figures 1, 1A:
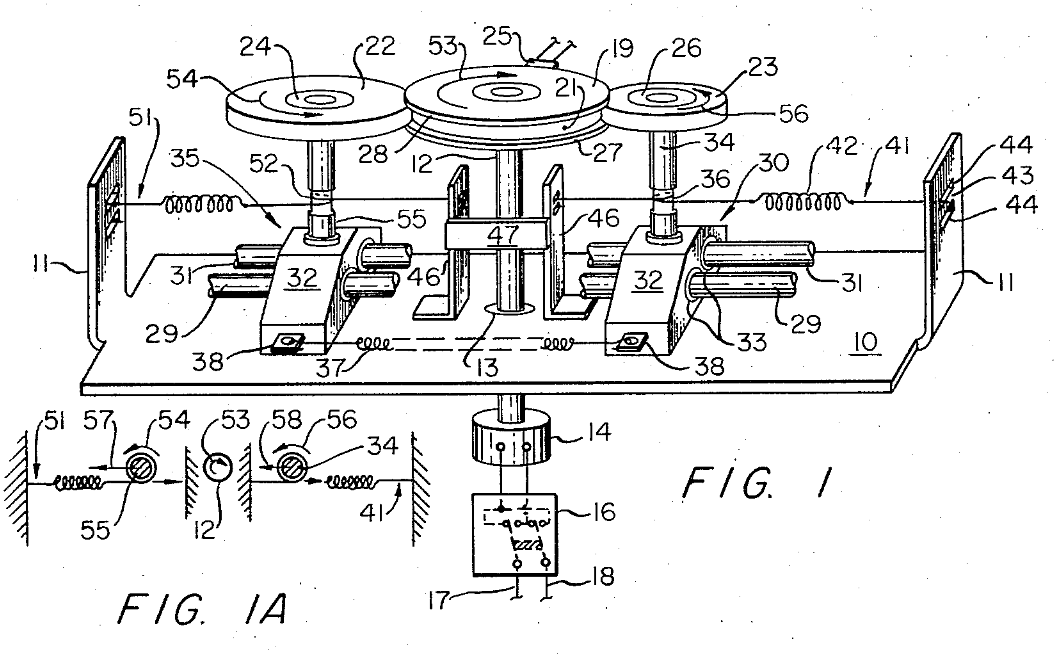
FIGURE 1 is a schematic perspective view of apparatus according to the invention.
FIGURE 1A is a diagram illustrating operation of the apparatus shown in FIGURE 1.

According to the embodiment shown in FIGURE 1, there is schematically provided a tape transport apparatus according to the invention. A platform or base 10 is formed with a pair of ears 11 bent upwardly therefrom. Base 10 supports a drive shaft 12 journalled therethrough as at 13, so that shaft 12 can be driven by motor 14 in either of two opposite directions under control of the reversing switch 16 which takes power via leads 17, 18.

A drive capstan 19 provided with a resilient driving surface 21 is connected to be rotated with shaft 12.

As shown in FIGURE 1, a length of pliable recording tape is wrapped to form supply and take-up rolls 22, 23, respectively. Thus, the tape on roll 22 is wrapped about a hub 24 while the tape forming roll 23 is wrapped about a hub 26. Hubs 24, 26 are supported for rotation in either of two opposite directions and accordingly, for convenience in describing the operation of the apparatus, directional arrows have been applied to the supply and take-up rolls as well as to the drive capstan. Capstan 19 includes a pair of flanges 27, 28, one of which is preferably spring-loaded in a direction toward the other in order to yieldingly engage the edges of the outer convolutions of tape. A magnetic recording transducer 25 is arranged to cooperate with the magnetic recording tape as it is fed from roll 22 to take-up roll 23.

Means for supporting each roll 22, 23 for rotation and lateral translation have been provided. Thus, a pair of spaced parallel guide rods 29, 31 have been provided. Rods 29, 31 are supported by means (not shown) whereby in their spaced parallel arrangement, they will provide guideways for carriage assemblies 30, 35 supporting each of the two rolls 22, 23. Inasmuch as both carriages 30, 35 are identical, only one will be described. As carriage assembly 30 comprises a support block 32 formed with a pair of spaced parallel openings provided with bearings 33 for slidably supporting carriage assembly 30 to ride along rods 29, 31. Carriage assembly 30 further includes a shaft forming an axle 34 journalled for rotation vertically in block 32 and adapted to support hub 26. Axle 34 is formed with a reduced sheave portion 36 for purposes as described hereinafter. Carriage assemblies 30, 35 are, accordingly, each independently movable along rods 29, 31.

Means yieldingly urge each carriage 30, 35 toward capstan 19. A spring 37 is coupled at its ends to each of carriages 30, 35 by means of the tabs 38 extending therefrom. Spring 37 serves to establish the general level of compressive force being applied between rolls 22, 23 and capstan 19.

Means responsive to wrapping of tape upon the take-up roll tend to increase the compressive force otherwise provided between the take-up roll and the resilient capstan surface 21. Thus, a strand 41 tensioned by a spring 42 is anchored at each end to stationary portions fixed to base 10. The ends of strand 41 are each provided with a hooked portion which is fed around a bar 43 defined between a pair of openings 44 formed in ear 11. The other end of a strand 41 is similarly anchored to an upwardly extending L-member 46 secured, as by welding, to base 10. The two L-members 46 are braced by means of a transverse bar 47 secured to each.

Strand 41 is looped around a sheave portion 36 in frictional engagement therewith; the amount of friction being determined by the tension of spring 42 and the coefficient of friction between strand 41 and sheave portion 36. The loop formed in strand 41 is wrapped about the axle 34 in a direction serving to cause axle 34 to tend to move along the strand in a direction leading toward the capstan. Portion 36 is of reduced diameter so as to minimize torque losses in the system.

A similar strand 51 is applied to the supply side of the apparatus. Thus, strand 51 forms a loop frictionally engaging the sheave portion 52 of the axle 55 of the supply roll, and the loop is wrapped about sheave portion 52 in a direction serving to cause axle 55 to tend to move along the strand 51 in a direction leading away from capstan 19.

In operation, and referring to the diagram shown in FIGURE 1A, it will be apparent that if capstan 19 is rotated in the direction of arrow 53, the supply and take-up axles 55, 34 will rotate in the direction of arrows 54, 56, respectively.

As axle 55 for supply roll 22 rotates in the direction of arrow 54, it will be apparent that due to the frictional engagement therearound of strand 51, its axle 55 will tend to "walk" or move along the strand in the direction of arrow 57. Similarly, and by virtue of the direction of the wrap of strand 41 about axle 34, rotation of axle 34 as shown will cause the take-up roll to move in the direction of arrow 58, i.e., toward capstan 19.

From the foregoing, it should be readily apparent that there has been provided friction means for tending to decrease the compressive force effected by spring 37 on the supply side of capstan 19 and which tends to increase the compressive force between the take-up roll and capstan on the take-up side, thereby developing the force differential across the capstan in conjunction with edge driven rolls of tape as found to be advantageous for the reasons outlined in the above identified patent application. The foregoing embodiment has the advantage of removing all frictional forces from direct coupling with the drive capstan shaft and applied to the shafts of supply and take-up rolls whereby limited degree of tape braking is applied as well as accommodation of all roll sizes without need to make adjustments.

Figure 2:
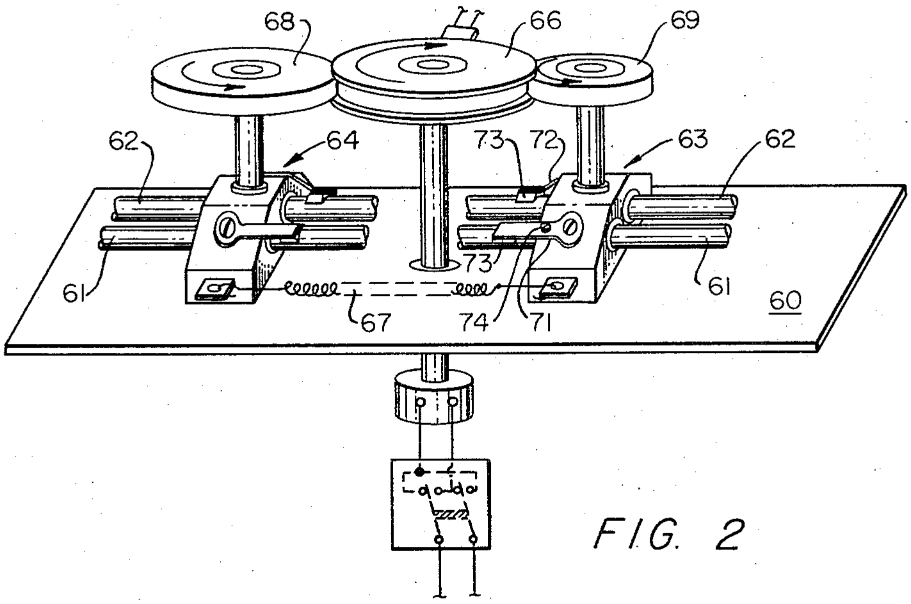
FIGURE 2 is a schematic perspective view of another embodiment of the invention.

According to another embodiment of the invention as shown in FIGURE 2, a cordless arrangement has been provided whereby friction means are employed to develop a friction force resistant to supply and take-up roll movement caused by withdrawal of tape from the supply roll and by wrapping of tape upon the take-up roll. A base 60 supports, by means not shown, a pair of spaced parallel guide rods 61, 62. A pair of carriage assemblies 63, 64 are slidably mounted on rods 61, 62 for independent movement toward and movement away from a drive capstan 66.

The embodiment shown in FIGURE 2 includes a spring 67 coupled to each of the carriage assemblies 63, 64 for drawing supply and take-up rolls 68, 69 into mutual contact with the resilient driving surface of capstan 66. The compressive force with which rolls 68, 69 bear against capstan 66 is varied by friction pads, carried by the carriages 63, 64, which are adapted to cooperate with rods 61, 62.

Thus, means have been provided for developing drag forces applied to each of carriages 63, 64, as now to be described.

With respect to carriage 63 and, understanding that carriage 64 is similarly provided, there is disclosed a pair of resilient fingers 71, 72 secured at one end to carriage 63 and provided at the opposite end with a felt friction pad 73 adapted to bear against and rub upon rods 61, 62. The degree to which pads 73 rub upon the guide rods may be adjusted by providing suitable means such as a screw 74 adapted to be threaded down through finger 71 until the end of the screw 74 bears against the surface of carriage 63. Then, by suitably adjusting the screw, its rubbing contact with rod 61, for example, can be adjusted.

Figure 2A:
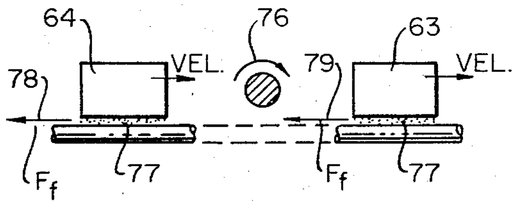
FIGURE 2A is a diagram illustrating operation of the embodiment of FIGURE 2.

With reference to FIGURE 2A, it can be seen that as capstan 66 rotates in the direction of arrow 76, tape will be drawn from supply roll 68 tending to draw carriage 64 to the right as shown in FIGURE 2. Frictional forces will be developed between carriage 64 and rods 61, 62 represented by the stippled zone 77 (FIGURE 2A) developing a frictional component of force acting in the direction of arrow 78. Another such component of frictional force 79 is developed on the take-up side.

It is, therefore, apparent that the frictional forces 78, 79 are resistant to movement of carriages 64, 63, respectively. The friction force on the supply side works to diminish the force of spring 67 as is compresses the supply roll into contact with the drive capstan 66. Therefore, the force represented by arrow 78 is subtractive from the force applied by spring 67 on the supply side. On the take-up side, however, frictional forces represented by arrow 79 are additive to the compressive force developed on the take-up side by spring 67. Accordingly, a force differential is created across capstan 66 in an advantageous manner relying on friction means requiring little adjustment. No cords are necessary and less energy is drawn from the rotating parts.

While both of the foregoing embodiments pertain to the application of couloumbic friction means for providing a tape transport apparatus wherein the development of a force differential is responsive to the unwrapping and wrapping of supply and take-up rolls respectively, viscous friction means may also be provided as might be accomplished by the use of dash-pots associated with the advancing and retreating movements of the carriages.

I claim:

1. A tape transport of the type adapted to support a length of pliable recording tape wrapped to form supply and take-up rolls comprising first and second carriage means for rotatably supporting each of said rolls respectively, annular rotating means having resilient arcuate surface portions disposed to be adapted to contact and rotate the supply and take-up rolls to feed tape from the former to the latter, said first and second carriage means being independently movable to respectively advance and retreat relative to said annular rotating means to maintain said contact by accommodating changes in roll diameters during transfer of tape from the supply to the take-up roll, means active during transfer of tape from said supply to said take-up roll for yieldingly urging said take-up and supply rolls against said annular rotating means to supply compressive forces therebetween, means responsive to wrapping of tape upon the take-up roll tending to increase the compressive force between said take-up roll and the annular rotating means, and means responsive to withdrawal of tape from the supply roll tending to reduce the compressive force between said supply roll and the annular rotating means.

2. Tape transport apparatus according to claim 1 wherein the penultimate and ultimate named means develop a force resistant to the respective advancing and retreating movements of said first and second carriage means.

3. In a tape transport of the type adapted to support a length of pliable recording tape wrapped to form supply and take-up rolls, means for supporting each of said rolls for rotation and lateral translation, a drive capstan, motive means for driving said capstan, a resilient peripheral surface around the capstan, means urging said supply and take-up rolls into contacting relation with the resilient periphery of the capstan, means active during transfer of the tape to develop a greater compressive force at the point of contact between the take-up roll and capstan surface than between the supply roll and capstan surface, the last named means including first means responsive to the withdrawal of tape from the supply roll to tend to reduce the compressive force between the supply roll and said capstan surface and second means responsive to the wrapping of tape upon the take-up roll to tend to increase the compressive force between the take-up roll and said capstan surface.

4. Tape transport apparatus according to claim 3 wherein each of said first and second means includes axles defining the respective axes of rotation of said supply and take-up rolls, and a strand forming a loop frictionally engaging the axle of said supply roll and a loop frictionally engaging the axle of said take-up roll, said loops being wrapped about said axles in a direction serving to cause the axle of said supply roll to tend to move along the strand in a direction leading away from said capstan and to cause the axle of said take-up roll to tend to move along the strand in a direction leading toward said capstan.

5. Tape transport apparatus according to claim 3 wherein said first and second means include means for developing a friction force resistant to supply and take-up roll movement generated by said withdrawal of tape and said wrapping of tape.

6. A tape transport of the type adapted to support a length of pliable recording tape wrapped to form supply and take-up rolls, means for supporting each of said rolls for rotation, a drive capstan, motive means for driving said capstan, a resilient peripheral surface around the capstan, means serving to urge the supply and take-up rolls into edge driving contact relation with respect to said periphery to respectively provide compressive forces therebetween, and means developing frictional resistance acting to modify said urging to develop a relatively greater compressive force applied between said take-up roll and said capstan periphery than between said supply roll and said periphery.

7. Tape transport apparatus according to claim 6 wherein said rolls are supported to move laterally on carriages with respect to said capstan, and the last named means includes friction pads disposed to rub upon a surface portion of the apparatus during lateral movement of said rolls.

References Cited

UNITED STATES PATENTS

| | | | |
|---|---|---|---|
| 2,374,038 | 4/1945 | Ress | 242—55.13 |
| 2,733,069 | 1/1956 | Frost et al. | 242—55.14 X |

FOREIGN PATENTS

| | | |
|---|---|---|
| 274,528 | 7/1927 | Great Britain. |

LEONARD D. CHRISTIAN, *Primary Examiner.*